United States Patent Office 2,833,071
Patented May 6, 1958

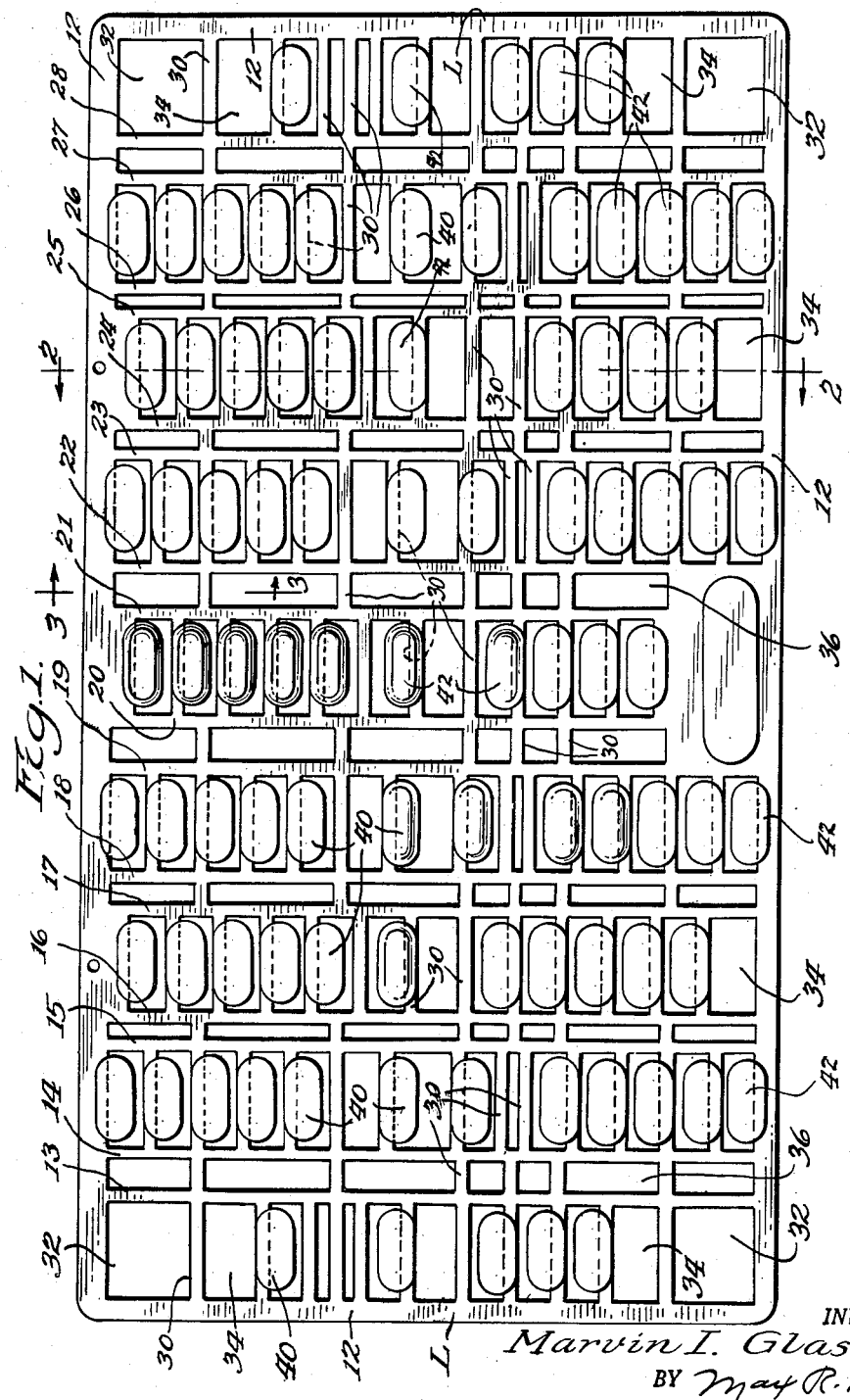

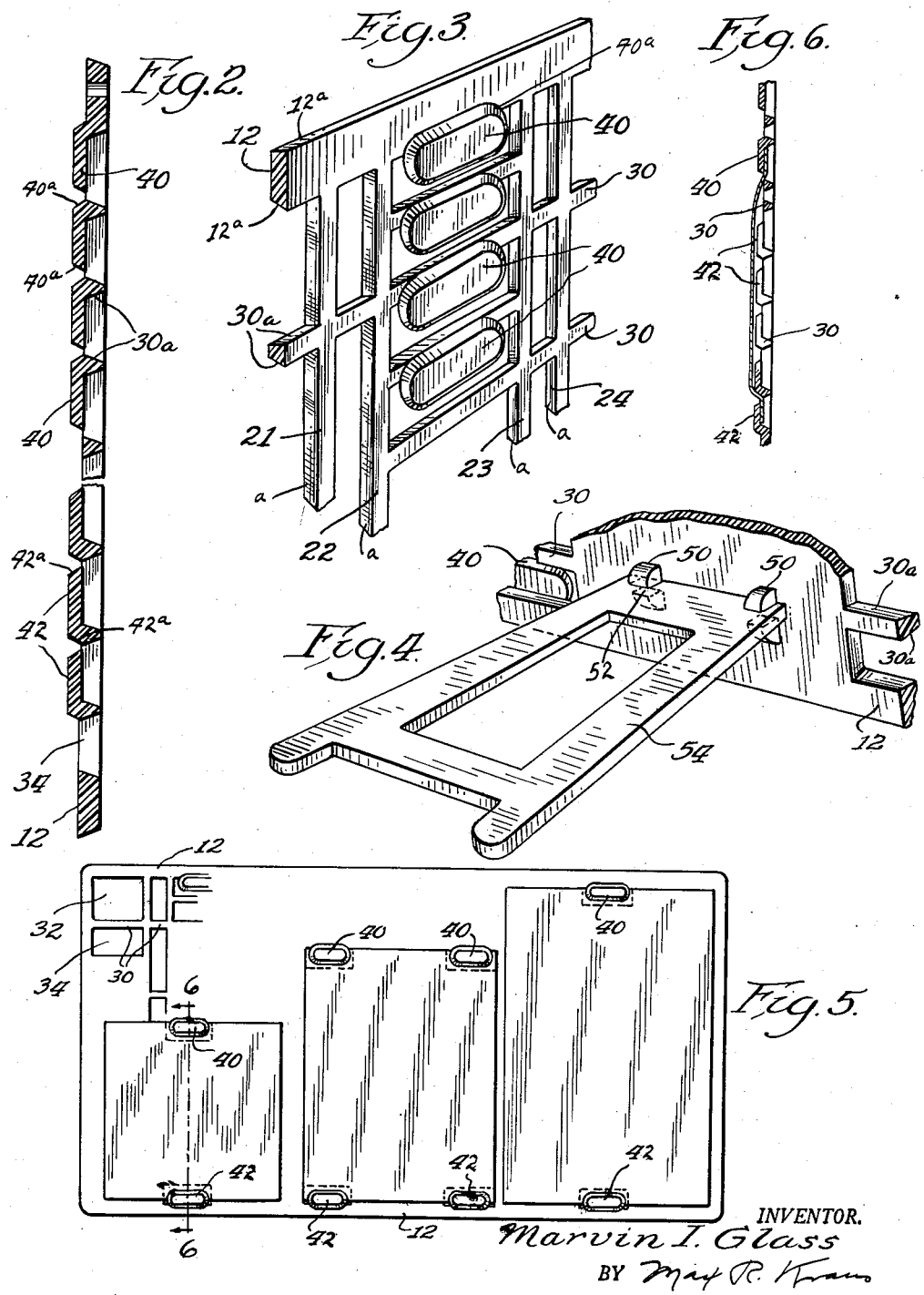

2,833,071

FRAME FOR HOLDING A PLURALITY OF SNAPSHOT PHOTOS

Marvin I. Glass, Chicago, Ill.

Application December 1, 1954, Serial No. 472,447

1 Claim. (Cl. 40—152.1)

This invention relates to a frame for holding a plurality of snapshot photos and the like.

One of the objects of this invention is to provide a holder for snapshots which is molded of plastic material and produced as a one shot molded piece, and which requires very little plastic material.

Another object of this invention is to provide an integrally formed snapshot holder in the form of a grille or open network of bars with means for simultaneously holding snapshots of any size or shape and so constructed that the snapshots may be positioned in any arrangement desired.

Another object of this invention is to provide a holder for snapshots which is decorative, which is a finished integrally formed product as it comes from the mold, thus requiring no assembly or other manufacturing steps and which is relatively simple and inexpensive to produce.

Other objects will become apparent as this description progresses.

In the drawings:

Fig. 1 is a front elevational view of the holder forming the subject matter of this invention.

Fig. 2 is an enlarged cross-sectional fragmentary view taken along line 2—2 of Fig. 1.

Fig. 3 is an enlarged perspective view of a section of the holder taken in the area of 3—3 of Fig. 2.

Fig. 4 is a perspective view showing the lower back portion of the holder together with the easel.

Fig. 5 is a front view of the holder in reduced size and showing how a number of different sized snapshots may be supported thereon, and Fig. 6 is a section taken on line 6—6 of Fig. 5.

The snapshot holder generally designated by the numeral 10 is preferably molded of plastic and is so constructed that it may be ejected from the ejection molding machine as one shot—that is—when same is ejected from the molding machine it is a complete structure and there is no assembly work needed to form the holder. When ejected the holder contains all of the snap shot holding means.

The complete holder, as best shown in Fig. 1 is of rectangular shape and is formed of a series of longitudinal and transverse bars in the form of an open network or grille with the bars intersecting each other. While the holder is formed in the arrangement shown, it will of course be understood that the grille or open network may be formed in any other arrangements of bars. The holder has a continuous outer border designated by the numeral 12 extending around the top, bottom and sides thereof and the holder is substantially of the size of a license plate.

Formed integrally with the border are a plurality of spaced vertical bars designated by the numerals 13, 14, 15, 16, 17, 18, 19, 20, 21, 22, 23, 24, 25, 26, 27, and 28, which extend from the top to the bottom of the border. Connecting with said vertical bars are transverse or cross bars all of which are designated by the numeral 30 which intersect and are joined to the vertical bars so as to form open spaces therebetween. It will be seen that the transverse or cross bars 30 are arranged in such manner that in some instances the transverse bars extend directly across from one side border to the other on the same longitudinal plane, whereas in other instances the transverse bars only extend between two vertical bars and in other instances they are staggered so that one transverse bar extends between two vertical bars or between the side edge and one vertical bar, whereas the adjacent or adjoining transverse bar is staggered and spaced above or below the adjoining transverse bar. With this arrangement various shapes or open spaces are provided. For example, in the opposite corners of the framework there is shown square shaped open spaces designated by the numeral 32 and in other instances rectangular shaped openings of one size are provided such as indicated by the numeral 34 and in other instances other rectangular shaped openings are formed such as indicated at 36. Other shaped openings not specifically identified by numeral are formed throughout the framework.

Certain of said transverse or cross bars 30 are formed with lips or retaining members, all of which are generally designated either by the numeral 40 or 42. These lips are best illustrated in Figs. 2 and 3 of the drawings. They are of substantially oval shape in plan and are formed integrally with the transverse bars 30 or with the top and bottom borders 12 and the lips generally above the longitudinal line L—L of Fig. 1 extend downwardly whereas the lips below said line extend upwardly. The downwardly extending lips are designated by the numeral 40 whereas all of the upwardly extending lips are designated by the numeral 42. Each of the lips while oval shaped have a tapered or inclined border 40a and 42a respectively around said oval at the front thereof. Wherever a lip is provided it extends forwardly and downwardly (lips 40) or upwardly (lips 42) of the transverse bars 30 and over a portion of the adjacent open space of the network. The lips are spaced from each other.

The rear of the border 12 is provided with tapered or inclined surfaces as indicated by the numeral 12a and all the transverse and vertical bars are likewise provided at the rear thereof with tapered or inclined surfaces indicated respectively by the numeral 30a and the letter a, so that the holder may be easily ejected from the injection mold. That is, the taper extends from the front to the back of the bars.

As best shown in Fig. 4, the lower back portion of the holder is provided with a pair of spaced bosses 50 each provided with a transverse slot 52 which detachably receives an easel member generally designated by the numeral 54 which easel member supports the holder in an inclined upright position. While the easel member is a separate piece it likewise may be molded as a one shot piece and may be readily secured to the holder for supporting same.

By providing the holder of the character shown with downwardly extending lips in spaced relation and with upwardly extending lips in spaced relation it will be seen that any sized or shaped snapshot or the like may be readily inserted in the lips of the holder and retained therein.

Fig. 5 shows three different sized snapshots held in the holder.

It will be understood that snapshots, either of one size or various sizes may be secured in any staggered or straight line arrangement and that the snapshots may be moved or rearranged on the holder very quickly and conveniently. The snapshot is held between any downwardly and any upwardly extending lip and a snapshot is held as best shown in Fig. 6. The upper and lower marginal edges of the snapshot is confined in the lips with the intermediate or picture portion of same extending over and covering the portion of the holder therebetween. The snapshot obviously would cover some of the intermediate lips therebetween and some of the vertical and cross bars depending upon where the snapshot is positioned.

With the foregoing I have provided a very simple and expensive holder which is of itself ornamental and which permits the positioning and retaining of any number of snapshots or the like in any desired arrangement to fill or partially fill the open network of the holder. Obviously some portions of the holder will remain uncovered and in such instances the various bars and corresponding lips will be visible. This however is not objectionable as the open network of bars presents an ornamental and attractive appearance. This holder, by virtue of the fact that it utilizes very little material and requires no assembly, is very inexpensive to manufacture as well.

It will be understood that various changes and modifications may be made from the foregoing without departing from the spirit and scope of the appended claim.

I claim:

A holder comprising a one piece integrally formed rectangular shaped member having a plurality of spaced longitudinal and vertical bars joined together to form a plurality of open spaces therebetween, a plurality of spaced downwardly extending retaining members positioned over the upper half of said frame, a plurality of spaced upwardly extending retaining members positioned over the lower half of said frame, said retaining members extending over the open spaces and covering a substantial area thereof, there being no more than one of said retaining members for any single open space, said retaining members adapted to removably support a plurality of snapshots or the like of various sizes and shapes in any desired arrangement, each of said snapshots or the like being retained between the downwardly and upwardly extending retaining means of two or more separate open spaces and covering said separate open spaces.

References Cited in the file of this patent

UNITED STATES PATENTS

| | | |
|---|---|---|
| 214,770 | Gathright | Apr. 29, 1879 |
| 1,629,285 | Mabee | May 17, 1927 |
| 2,290,831 | Fink | July 21, 1942 |
| 2,687,590 | Johnson | Aug. 31, 1954 |
| 2,697,293 | Greenhunt | Dec. 21, 1954 |
| 2,747,894 | Porter | May 29, 1956 |